United States Patent
Chen

(10) Patent No.: US 7,417,687 B2
(45) Date of Patent: Aug. 26, 2008

(54) VIDEO SYNCHRONIZATION SIGNAL REMOVAL CIRCUITRY

(75) Inventor: Dongwei Chen, Fremont, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 546 days.

(21) Appl. No.: 10/908,902

(22) Filed: May 31, 2005

(65) Prior Publication Data

US 2006/0268173 A1 Nov. 30, 2006

(51) Int. Cl.
*H04N 5/08* (2006.01)

(52) U.S. Cl. .................. 348/525; 348/521; 348/527

(58) Field of Classification Search ............. 348/525, 348/520–522, 524, 527, 531–533, 516, 500–501, 348/540, 634, 636–637; 327/27, 24, 74–75; *H04N 5/08*
See application file for complete search history.

(56) References Cited

U.S. PATENT DOCUMENTS

| 5,091,774 | A | * | 2/1992 | Lovely et al. | 348/502 |
| 5,140,422 | A | * | 8/1992 | Constable | 348/525 |
| 5,278,651 | A | * | 1/1994 | Wada et al. | 348/500 |
| 6,169,581 | B1 | * | 1/2001 | Conover | 348/525 |
| 7,176,979 | B2 | * | 2/2007 | Bohm et al. | 348/531 |

* cited by examiner

*Primary Examiner*—Trang U Tran
(74) *Attorney, Agent, or Firm*—Vedder Price P.C.

(57) ABSTRACT

A video synchronization signal removal circuit in which a synchronization signal component of an incoming video signal is detected whereupon a reference signal corresponding to a black video level is substituted substantially during the synchronization signal interval.

19 Claims, 3 Drawing Sheets

VIDEO SYNCHRONIZATION SIGNAL REMOVAL CIRCUITRY

BACKGROUND OF THE INVENTION

The present invention relates to circuitry for processing component video signals, and in particular, to circuitry for removing synchronization signals from component video signals.

As is well-known, computer monitors and, increasingly, many higher quality televisions, receive their display signals in the form of component video signals such as GBR (green, blue, red), YPbPr (luminance, blue difference, red difference). Typically, the first of the three channels (e.g., the green and luminance signals) contains a composite signal in which both the video (green or luminance) and synchronization (horizontal and vertical) components are included. As is also well-known, the Consumer Electronics Association (CEA) standards (e.g., CEA-770.1-C, CEA-770.2-C and CEA-770.3-C) for component video signals specify the component video signal also containing the synchronization component to be a one-volt peak-to-peak signal, with the one extreme signal peak (e.g., minimum or lower) being that of the tip of the synchronization signal component and the opposite extreme signal peak (e.g., maximum or upper) being that of the maximum level, i.e., white, of the video signal component. For example, in conformance with the CEA-770.1-C standard, these voltage levels are −286 mV (mV) and +714 mV, respectively, while for the CEA-770.2-C and CEA-770.3-C standards, these levels are −300 mV and +700 mV, respectively. (For all three of these standards, the voltage levels for the other two component signals, Pb and Pr, are −350 mV and +350 mV.)

Successful operation within the standards often requires removal of the synchronization signal excursions, or "tips". One conventional technique removes the synchronization signal tips by forcing the signal containing the synchronization signal component, e.g. the luminance Y signal, to be fixed at or above the reference video black level. However, the tri-level synchronization signal used in high definition television (HDTV) analog component video signals (FIG. 1B) tends to be problematic since such technique cannot remove the synchronization tips completely, thereby often resulting in undesired residual signal components related to the original synchronization signal tips.

SUMMARY OF THE INVENTION

In accordance with the presently claimed invention, a video synchronization signal removal circuit is provided in which a synchronization signal component of an incoming video signal is detected whereupon a reference signal corresponding to a black video level is substituted substantially during the synchronization signal interval.

In accordance with one embodiment of the presently claimed invention, video synchronization signal removal circuitry includes reference, output and video signal electrodes, control circuitry and signal routing circuitry. A reference electrode conveys a reference signal corresponding to a black video level. One or more output electrodes convey one or more output signals. One or more video signal electrodes convey one or more video signals, at least one of which includes a synchronization signal component having, between at least leading and trailing signal transitions, one or more signal values substantially unequal to the black video level. The control circuitry is coupled to at least one of the one or more video signal electrodes and responsive to the synchronization signal component by providing a control signal having assertion and de-assertion states, wherein the control signal is provided in the assertion state in response to an earlier portion of the synchronization signal component leading signal transition transcending a first threshold, following which the control signal: remains in the assertion state for a predetermined time interval in response to a later portion of the leading synchronization signal component signal transition transcending a second threshold beyond the first threshold, wherein the predetermined time interval is initiated by the later portion of the leading synchronization signal component signal transition transcending the second threshold and is terminated following a last one of the synchronization signal component leading and trailing signal transitions; and is provided in the de-assertion state in response to the later portion of the leading synchronization signal component signal transition failing to transcend the second threshold. The signal routing circuitry is coupled to the reference electrode, the one or more output electrodes, the one or more video signal electrodes and the control circuitry, and responsive to the control signal by conveying, as the one or more output signals, the reference signal substantially during the control signal assertion state and conveying the one or more video signals otherwise.

In accordance with another embodiment of the presently claimed invention, video synchronization signal removal circuitry includes reference, output and video signal electrodes, signal detection circuitries, control circuitry and signal routing circuitry. A reference electrode conveys a reference signal corresponding to a black video level. One or more output electrodes convey one or more output signals. One or more video signal electrodes convey one or more video signals, at least one of which includes a synchronization signal component having, between at least leading and trailing signal transitions, one or more signal values substantially unequal to the black video level. First signal detection circuitry is coupled to the at least one video signal electrode and responsive to the synchronization signal component by providing a first signal pulse having assertion and de-assertion states. Second signal detection circuitry is coupled to the at least one video signal electrode and responsive to the synchronization signal component by providing a second signal pulse having assertion and de-assertion states. The control circuitry is coupled to the first and second signal detection circuitries, and responsive to the first and second signal pulses by providing a control signal having assertion and de-assertion states, wherein the control signal is provided in the assertion state in response to the first signal pulse assertion state, following which the control signal: remains in the assertion state for a predetermined time interval in response to the second signal pulse assertion state, wherein the predetermined time interval is initiated by the second signal pulse assertion state and is terminated following a last one of the synchronization signal component leading and trailing signal transitions; and is provided in the de-assertion state in response to the first and second signal pulse de-assertion states. The signal routing circuitry is coupled to the reference electrode, the one or more output electrodes, the one or more video signal electrodes and the control circuitry, and responsive to the control signal by conveying, as the one or more output signals, the reference signal substantially during the control signal assertion state and conveying the one or more video signals otherwise.

In accordance with still another embodiment of the presently claimed invention, a method for removing a video synchronization signal includes:

receiving a reference signal corresponding to a black video level;

receiving one or more video signals, at least one of which includes a synchronization signal component having, between at least leading and trailing signal transitions, one or more signal values substantially unequal to the black video level;

generating, in response to the synchronization signal component, a control signal having assertion and de-assertion states, wherein the control signal is provided in the assertion state in response to an earlier portion of the synchronization signal component leading signal transition transcending a first threshold, following which the control signal remains in the assertion state for a predetermined time interval in response to a later portion of the leading synchronization signal component signal transition transcending a second threshold beyond the first threshold, wherein the predetermined time interval is initiated by the later portion of the leading synchronization signal component signal transition transcending the second threshold and is terminated following a last one of the synchronization signal component leading and trailing signal transitions, and is provided in the de-assertion state in response to the later portion of the leading synchronization signal component signal transition failing to transcend the second threshold; and responding to the control signal by conveying, as one or more output signals, the reference signal substantially during the control signal assertion state and conveying the one or more video signals otherwise.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

Figure 1A:
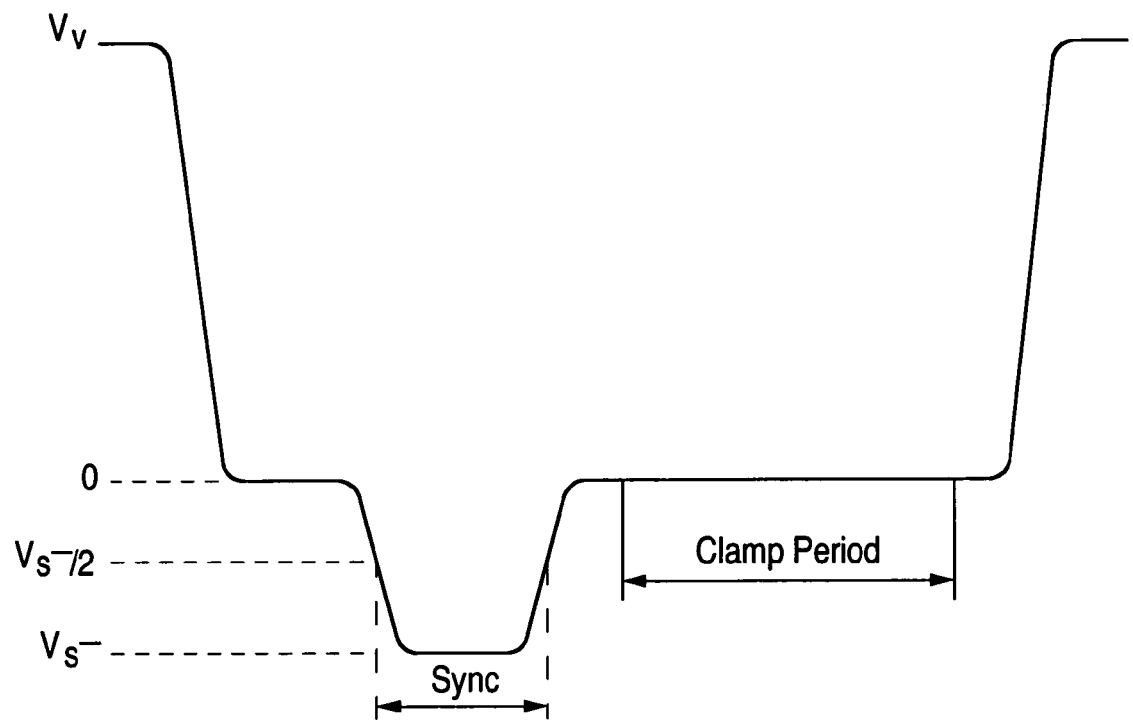
FIGS. 1A and 1B are signal timing diagrams of horizontal synchronization intervals for video signals with two-level and three-level synchronization signals, respectively.
Figure 1B:
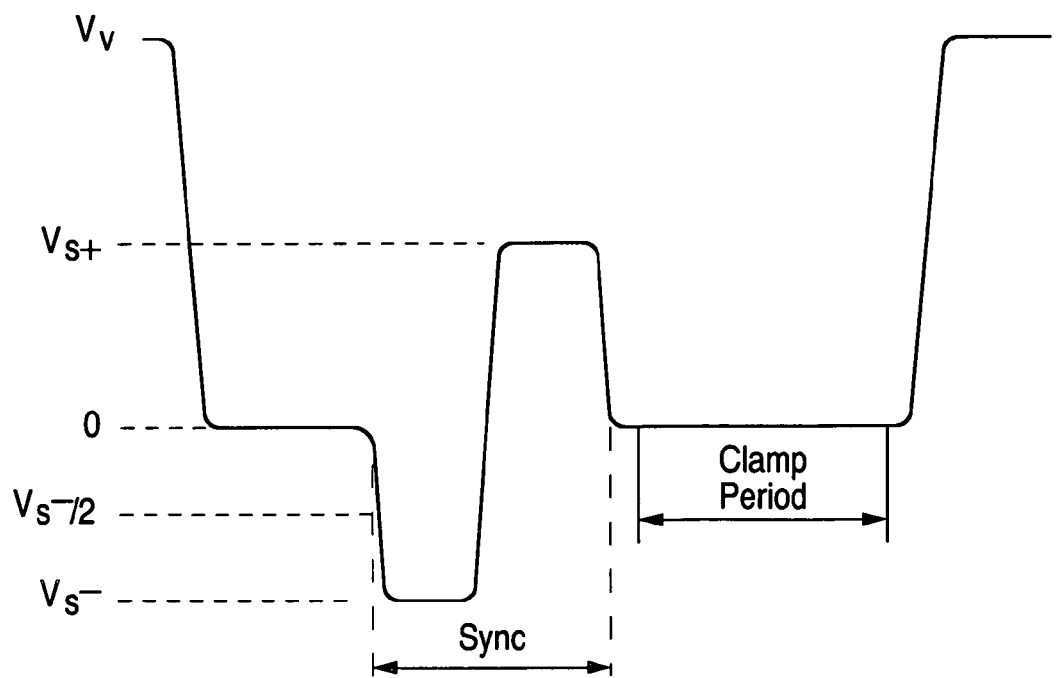

Referring to FIGS. 1A and 1B, a video signal clamp in accordance with the presently claimed invention detects the horizontal synchronization signal component by detecting the occurrence of the synchronization signal tip, and uses such detected signal to clamp the video signal during the clamp period. As is well-known, this clamp period, also known as the "back porch" of the horizontal synchronization signal interval, is at the video black level (typically zero volts) according to the applicable video signal standard. As is also well-known, the voltage levels of the lower Vs− and upper Vs+ synchronization tips are −286 and +286 mV for the CEA-770.1-C standard, and −300 and +300 mV for the CEA-770.2-C and CEA-770.3-C standards. By using the synchronization signal tip(s) to determine the timing for establishing the timing of the clamp period, such a video signal clamp can be used for clamping video signals according to multiple video signal standards.

Figure 2:
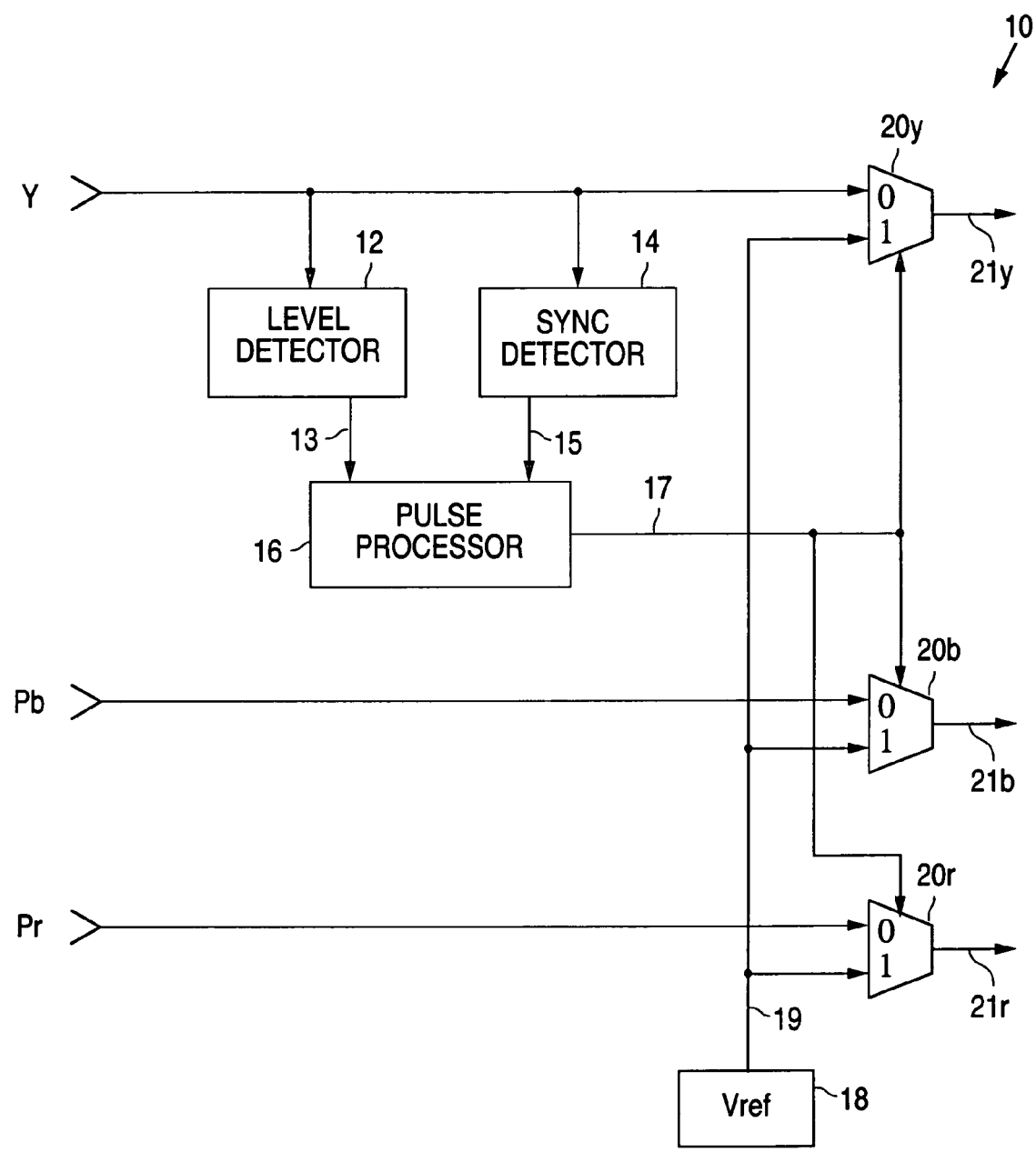
FIG. 2 is a functional block diagram of video synchronization signal removal circuitry in accordance with one embodiment of the presently claimed invention.

Referring to FIG. 2, synchronization signal removal circuitry in accordance with one embodiment 10 of the presently claimed invention includes level detection circuitry 12, synchronization signal detection 14, pulse processing circuitry 16, a reference voltage source (equal to the video reference black level) 18, and signal routing circuitry 20, all interconnected substantially as show. In a preferred embodiment, the signal routing circuitry 20 includes individual routing circuits 20$y$, 20$b$, 20$r$ for the individual component video signals Y, Pb, Pr. Such routing circuits 20$y$, 20$b$, 20$r$ can be implemented in the form of switching circuits or multiplexing circuits, as desired, many types of which are well-known in the art. The voltage reference source 18 can be implemented in any of a number of ways well known in the art, and may include a stable voltage reference source such as a bandgap voltage source.

As discussed in more detail below, the level detection circuit 12 detects a change in level of the incoming video signal Y, such as that occurring during the early portion of the leading edge of the synchronization signal. When such a video signal level detected, a signal pulse 13 is asserted and provided to the pulse processing circuit 16. Similarly, the synchronization signal detection circuit 14 detects the occurrence of the synchronization signal tip by detecting the level of the synchronization signal during a later portion of its leading signal edge. Upon detection, another signal pulse 15 is asserted for a predetermined interval (discussed in more detail below) and provided to the pulse processing circuit 16. The pulse processing circuit 16 processes, e.g., combines, these asserted signal pulses 13, 15 to provide a control signal 17 which is asserted during the combined duration of the detection signal pulses 13, 15. During assertion of this control signal 17, the signal routing circuits 20$y$, 20$b$, 20$r$ select and provide the reference voltage 19 from the voltage reference source 18 as the output signals 21$y$, 21$b$, 21$r$. During de-assertion of the control signal 17 (e.g., during the active video portions of the component video signals Y, Pb, Pr), the signal routing circuits 20$y$, 20$b$, 20$r$ select and provide the component video signals Y, Pb, Pr as the output signals 21$y$, 21$b$, 21$r$.

Figure 3:
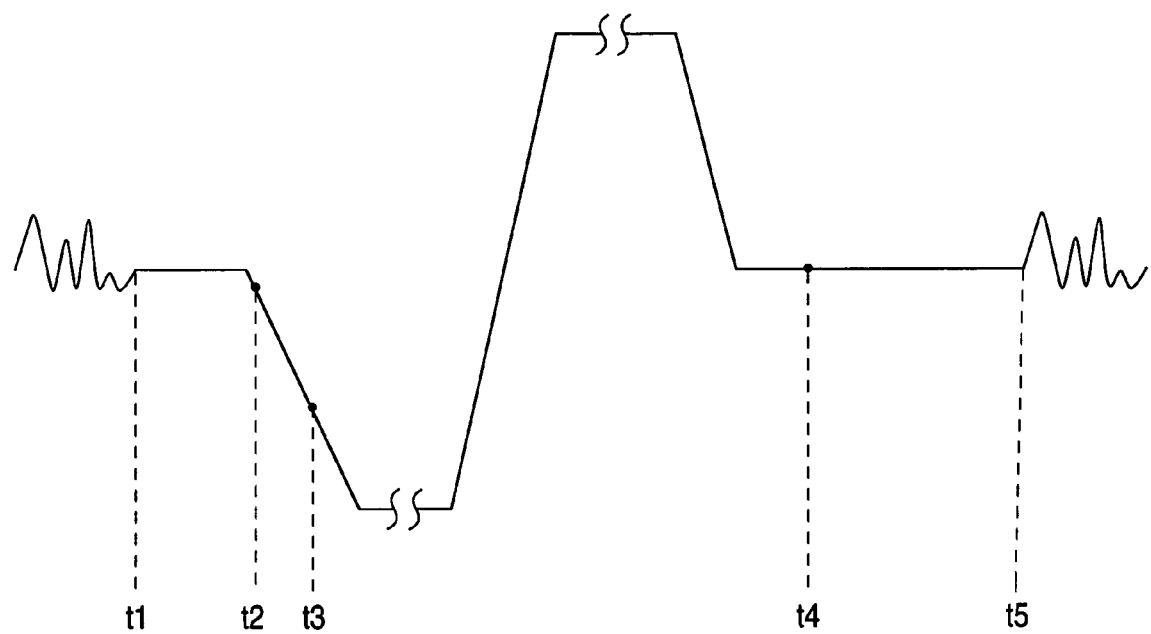
FIG. 3 is another signal timing diagram of a three-level synchronization signal identifying various timing points pertinent to the presently claimed invention.
Figure 4:
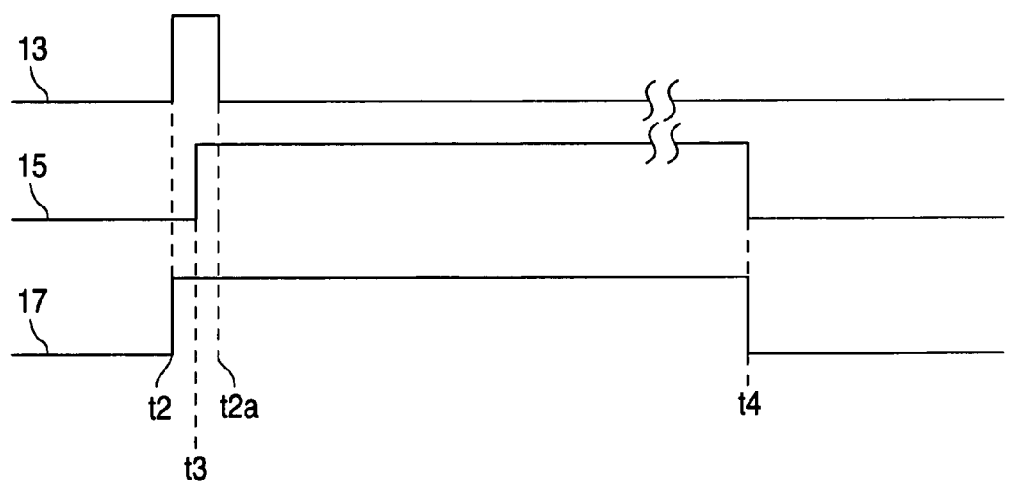
FIG. 4 is a signal timing diagram illustrating various signals generated within the circuitry of FIG. 2.

Referring to FIGS. 3 and 4, the synchronization signal interval begins at time t1 (prior to which is the active video portion of the signal). As discussed above, at a very early stage in the leading edge of the synchronization signal at time t2, this level of the synchronization signal is detected by the level detection circuit 12 which then asserts its output signal 13. Later in the synchronization signal leading edge, e.g., at approximately the half-amplitude point at time t3, such level of the synchronization signal tip is detected by synchronization signal detection circuit 14 which asserts its output signal 15. These two signals 13, 15 are processed, e.g., combined in accordance with a logical OR function, by the pulse processing circuit 16 which asserts its output signal 17 accordingly. As discussed above, it is during this assertion interval t3-t4 of the control signal 17 that the reference voltage 19 is used to provide the output signals 21*y*, 21*b*, 21*r*.

The duration of the asserted signal 13 from the level detection circuit 12 is preferably short in duration. The reason for this is that in the event that a synchronization signal excursion has not yet actually begun, but instead sufficient signal noise has caused enough of a change in signal level that the level detection circuit 12 is triggered, the larger threshold associated with the synchronization signal detection circuit 14 will not be crossed, thereby preventing its signal 15 from being asserted. Accordingly, the reference voltage 19 will be selected only during the very short duration of the detection signal 13, thereby producing only a minor glitch in the output signals 21*y*, 21*b*, 21*r* due to the switching action of the signal routing circuits 20*y*, 20*b*, 20*r*.

As shown in FIGS. 3 and 4, the assertion of the signal 15 from the synchronization signal detection circuit 14 begins at time t3, as discussed above, and terminates at time t4 which can be at virtually any desired point in time following termination of the synchronization signal tips and prior to the termination of the synchronization signal interval at time t5 (prior to resumption of the active video signal portion). In accordance with many well-known techniques, the duration of the assertion of this signal 15 can be determined using counter circuits or capacitively-controlled delays within either the synchronization signal detection circuit 14.

As shown in FIG. 4, according to one embodiment of the presently claimed invention, assertion of the signal 15 produced by the synchronization signal detection circuit 14 is controlled within the synchronization signal detection circuit 14, thereby producing the asserted signal 15 as shown. However, it will be readily appreciated by one of ordinary skill in the art that the assertion state of this signal 15 can be of a shorter duration, with any necessary extension, or "stretching", of the assertion state of the control signal 17 being controlled within the pulse processing circuit 16.

Based upon the foregoing discussion, a video synchronization signal removal circuit 10 in accordance with the presently claimed invention detects the initiation of the synchronization signal component of an incoming video signal and substitutes a known reference voltage corresponding to the black video level during the synchronization signal interval, thereby avoiding problems associated with variances in the reference black level of the incoming video signal as well as leakage of any synchronization signal components to the output.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including video synchronization signal removal circuitry, comprising:
   a reference electrode to convey a reference signal corresponding to a black video level;
   one or more output electrodes to convey one or more output signals;
   one or more video signal electrodes to convey one or more video signals, at least one of which includes a synchronization signal component having, between at least leading and trailing signal transitions, one or more signal values substantially unequal to said black video level;
   control circuitry coupled to at least one of said one or more video signal electrodes and responsive to said synchronization signal component by providing a control signal having assertion and de-assertion states, wherein said control signal is provided in said assertion state in response to an earlier portion of said synchronization signal component leading signal transition transcending a first threshold, following which said control signal
      remains in said assertion state for a predetermined time interval in response to a later portion of said leading synchronization signal component signal transition transcending a second threshold beyond said first threshold, wherein said predetermined time interval is initiated by said later portion of said leading synchronization signal component signal transition transcending said second threshold and is terminated following a last one of said synchronization signal component leading and trailing signal transitions, and
      is provided in said de-assertion state in response to said later portion of said leading synchronization signal component signal transition failing to transcend said second threshold; and
   signal routing circuitry coupled to said reference electrode, said one or more output electrodes, said one or more video signal electrodes and said control circuitry, and responsive to said control signal by conveying, as said one or more output signals, said reference signal substantially during said control signal assertion state and conveying said one or more video signals otherwise.

2. The apparatus of claim 1, wherein said control circuitry comprises:
   signal detection circuitry responsive to said synchronization signal component by providing at least first and second signal pulses, wherein
      said first signal pulse includes assertion and de-assertion states following leading and trailing edges, respectively,
      said second signal pulse includes assertion and de-assertion states following leading and trailing edges, respectively,
      said first signal pulse leading edge is initiated in response to said earlier portion of said synchronization signal component leading signal transition, and
      said second signal pulse leading edge is initiated in response to said later portion of said leading synchronization signal component signal transition transcending said second threshold; and
   pulse processing circuitry coupled to said signal detection circuitry and responsive to said first and second signal pulses by providing said control signal.

3. The apparatus of claim 2, wherein said first signal pulse trailing edge is initiated in response to a synchronization signal component trailing signal transition following said synchronization signal component leading signal transition.

4. The apparatus of claim 2, wherein said second signal pulse trailing edge is substantially independent of each one of said synchronization signal component leading and trailing signal transitions.

5. The apparatus of claim 2, wherein said signal detection circuitry comprises voltage comparison circuitry responsive to said synchronization signal component and first and second threshold voltages.

6. The apparatus of claim 2, wherein said signal detection circuitry comprises:
first signal detection circuitry coupled to said at least one video signal electrode and responsive to said synchronization signal component by providing said first signal pulse; and
second signal detection circuitry coupled to said at least one video signal electrode and responsive to said synchronization signal component by providing said second signal pulse.

7. The apparatus of claim 2, wherein said pulse processing circuitry comprises logic circuitry responsive to said first and second signal pulses by combining said first and second signal pulse assertion states in conformance with a logical OR operation to provide said control signal in said assertion state.

8. The apparatus of claim 1, wherein said signal routing circuitry comprises signal switching circuitry.

9. An apparatus including video synchronization signal removal circuitry, comprising:
a reference electrode to convey a reference signal corresponding to a black video level;
one or more output electrodes to convey one or more output signals;
one or more video signal electrodes to convey one or more video signals, at least one of which includes a synchronization signal component having, between at least leading and trailing signal transitions, one or more signal values substantially unequal to said black video level;
first signal detection circuitry coupled to said at least one video signal electrode and responsive to said synchronization signal component by providing a first signal pulse having assertion and de-assertion states;
second signal detection circuitry coupled to said at least one video signal electrode and responsive to said synchronization signal component by providing a second signal pulse having assertion and de-assertion states;
control circuitry coupled to said first and second signal detection circuitries, and responsive to said first and second signal pulses by providing a control signal having assertion and de-assertion states, wherein said control signal is provided in said assertion state in response to said first signal pulse assertion state, following which said control signal
remains in said assertion state for a predetermined time interval in response to said second signal pulse assertion state, wherein said predetermined time interval is initiated by said second signal pulse assertion state and is terminated following a last one of said synchronization signal component leading and trailing signal transitions, and
is provided in said de-assertion state in response to said first and second signal pulse de-assertion states; and
signal routing circuitry coupled to said reference electrode, said one or more output electrodes, said one or more video signal electrodes and said control circuitry, and responsive to said control signal by conveying, as said one or more output signals, said reference signal substantially during said control signal assertion state and conveying said one or more video signals otherwise.

10. The apparatus of claim 9, wherein:
said first signal pulse assertion and de-assertion states follow leading and trailing edges, respectively;
said second signal pulse assertion and de-assertion states follow leading and trailing edges, respectively;
said first signal pulse leading edge is initiated in response to an earlier portion of said synchronization signal component leading signal transition transcending a first threshold; and
said second signal pulse leading edge is initiated in response to a later portion of said leading synchronization signal component signal transition transcending a second threshold beyond said first threshold.

11. The apparatus of claim 10, wherein said first signal pulse trailing edge is initiated in response to a synchronization signal component trailing signal transition following said synchronization signal component leading signal transition.

12. The apparatus of claim 10, wherein said second signal pulse trailing edge is substantially independent of each one of said synchronization signal component leading and trailing signal transitions.

13. The apparatus of claim 9, wherein said first and second signal detection circuitries comprise first and second voltage comparison circuitries responsive to said synchronization signal component and first and second threshold voltages.

14. The apparatus of claim 9, wherein said control circuitry comprises logic circuitry responsive to said first and second signal pulses by combining said first and second signal pulse assertion states in conformance with a logical OR operation to provide said control signal in said assertion state.

15. The apparatus of claim 9, wherein said signal routing circuitry comprises signal switching circuitry.

16. A method for removing a video synchronization signal, comprising:
receiving a reference signal corresponding to a black video level;
receiving one or more video signals, at least one of which includes a synchronization signal component having, between at least leading and trailing signal transitions, one or more signal values substantially unequal to said black video level;
generating, in response to said synchronization signal component, a control signal having assertion and de-assertion states, wherein said control signal is provided in said assertion state in response to an earlier portion of said synchronization signal component leading signal transition transcending a first threshold, following which said control signal
remains in said assertion state for a predetermined time interval in response to a later portion of said leading synchronization signal component signal transition transcending a second threshold beyond said first threshold, wherein said predetermined time interval is initiated by said later portion of said leading synchronization signal component signal transition transcending said second threshold and is terminated following a last one of said synchronization signal component leading and trailing signal transitions, and
is provided in said de-assertion state in response to said later portion of said leading synchronization signal component signal transition failing to transcend said second threshold; and
responding to said control signal by conveying, as one or more output signals, said reference signal substantially during said control signal assertion state and conveying said one or more video signals otherwise.

17. The method of claim 16, wherein said generating, in response to said synchronization signal component, a control signal having assertion and de-assertion states comprises generating at least first and second signal pulses, wherein:

said first signal pulse includes assertion and de-assertion states following leading and trailing edges, respectively;

said second signal pulse includes assertion and de-assertion states following leading and trailing edges, respectively;

said first signal pulse leading edge is initiated in response to said earlier portion of said synchronization signal component leading signal transition; and said second signal pulse leading edge is initiated in response to said later portion of said leading synchronization signal component signal transition transcending said second threshold.

18. The method of claim 17, wherein said generating at least first and second signal pulses comprises initiating said first signal pulse trailing edge in response to a synchronization signal component trailing signal transition following said synchronization signal component leading signal transition.

19. The method of claim 17, wherein said second signal pulse trailing edge is substantially independent of each one of said synchronization signal component leading and trailing signal transitions.

* * * * *

UNITED STATES PATENT AND TRADEMARK OFFICE
CERTIFICATE OF CORRECTION

PATENT NO.       : 7,417,687 B2  
APPLICATION NO.  : 10/908902  
DATED            : August 26, 2008  
INVENTOR(S)      : Dongwei Chen It is certified that error appears in the above-identified patent and that said Letters Patent is hereby corrected as shown below:

Column 4, line 32, please delete "show" and insert --shown--.

Column 5, line 60, please delete "alternations" and insert --alterations--.

Signed and Sealed this

Fourteenth Day of October, 2008

JON W. DUDAS  
*Director of the United States Patent and Trademark Office*